March 28, 1933.  F. KUBA  1,903,053

SCREW GEAR

Filed Dec. 11, 1931

F. Kuba INVENTOR

By: Markes & Clark ATTYS.

Patented Mar. 28, 1933

1,903,053

UNITED STATES PATENT OFFICE

FRANZ KUBA, OF VIENNA, AUSTRIA

SCREW GEAR

Application filed December 11, 1931, Serial No. 580,417, and in Austria December 11, 1930.

Screw gears have generally the task of transforming a rotation into a translation; they are also called screw systems.

The present invention makes no use of the axial shifting in such screw systems, but utilizes the relative rotation of one or more members of the screw system.

The invention is based upon the fact that the rotation of one or more intermediate screw members may be transmitted outward, by suitable means, which partake in the rotation, but not in the axial movement of the intermediate members.

Figure 1:
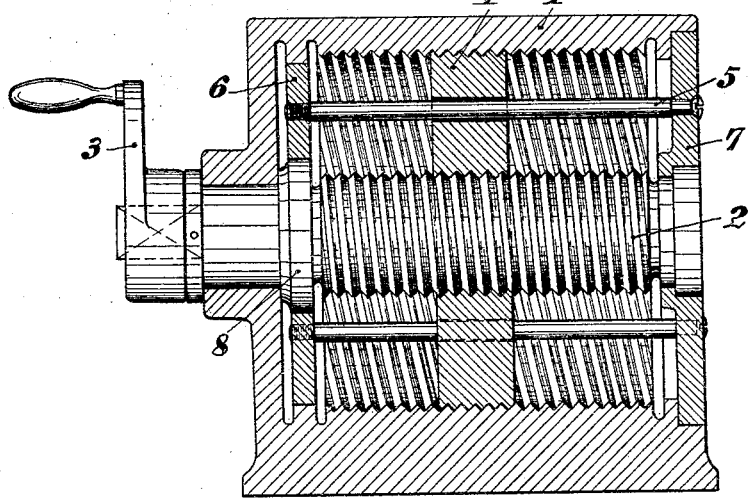
Figure 2:
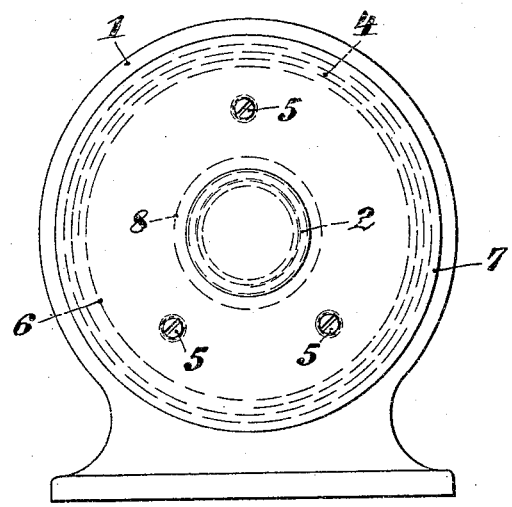

The drawing shows diagrammatically a gear constructed according to the invention, Figs. 1 and 2 showing the gear in sectional elevation and front view respectively.

In the casing 1, the screw 2, locked against axial movement, is driven by means of a windlass 3. The annular intermediate member 4 is provided with external and interior threads; the interior thread runs on the screw spindle 2, while the outer thread engages the female thread of the casing 1. The two threads have different pitches, so that the ring 4 will be shifted axially and, on the other hand, turned; the angle of rotation of the ring relative to the casing will be different from that of the spindle 2, measured likewise with respect to the casing 1. Now, the relative rotation of the spindle 2 with respect to the ring 4 is fully determined by the two pitches. Prismatic or round rods 5 go through the ring 4; the ends of these rods are solidly secured to 2 annular discs 6 and 7. The inner surface of the ring 6 slides on a cylindric surface of the collar 8; outwards, it runs on a cylindrical surface of the casing 1. The ring 7 slides, in a similar way, on a collar of the spindle 2 and a surface of the casing; in addition it is locked against axial movement.

The system, made according to the invention, allows of transmitting the rotation of the ring to outside parts; this is made possible by the position of the ring 7 from which the movement may be derived by suitable transmitting members. The axial movement of the ring 4, during its rotation, is unobstructed along the rods 5 while only the rotary component of the helicoidal movement of the ring is imparted to the rods 5 and is transmitted by the latter to the ring 7.

In order to make the above described gear system a continuous gear, the spindle 2 and the casing 1 are provided with the well known returning (endless) right and left-handed helicoidal grooves in which runs the ring 4 being furnished with pins. Thus the ring 4 is enabled to have a permanent rotation if the driving movement is continuous, because it now may run freely, forward and back, in axial direction. In addition, this feature of the construction allows of reducing the axial length of the gear, which is of great advantage for both the position of the gear and the stresses in the transmitting means 5.

I claim:

1. Screw gear for converting a rotary movement into a rotary movement of different speed, comprising in combination a case with an internal screw thread, a rotatable but axially immovable screw shaft axially passing through said case, the pitch of said screw shaft differing from the pitch of said internal screw thread, an annular disk rotatably mounted at each side of said internal screw thread, a collar fixed at each side of the screw threaded part of said shaft and rotatably mounted in said disk, an internally and externally screw threaded nut rotatable on said shaft and co-operating with said internal screw thread of the case, means passing through holes in said nut and fixed to said disks, and means on said shaft for rotating the same.

2. A screw and nut gearing for conveying rotary motion, comprising two screws having a common axis but different pitches, one of said screws being relatively movable with respect to the other screw and constituting the driving screw, a reciprocable and rotatable intermediate screw member meshing with both said screws, and a rotatable drive member held against movement axially of said screw and connected with said screw member for rotation therewith.

3. A screw and nut gearing as claimed in claim 2, characterized in that said rotatable drive member includes a rod passing through the intermediate screw member and permitting axial reciprocation thereof.

4. A gearing as claimed in claim 2, characterized in that both of said screws are provided with right and left hand screw threads.

In testimony whereof I affix my signature.

FRANZ KUBA.